United States Patent [19]

Coltrain et al.

[11] Patent Number: 5,010,128

[45] Date of Patent: Apr. 23, 1991

[54] COMPOSITES OF ETHERIC PHOSPHAZENE AND METAL OXIDES AND THE METHOD OF THEIR FORMATION

[75] Inventors: Bradley K. Coltrain; Wayne T. Ferrar, both of Fairport; Christine J. Landry, Honeoye Falls, all of N.Y.

[73] Assignee: Eastman Kodak Company, Rochester, N.Y.

[21] Appl. No.: 329,216

[22] Filed: Mar. 27, 1989

[51] Int. Cl.$^5$ .......................... C08G 79/02; C08J 3/21; C08K 3/22; C08K 3/34

[52] U.S. Cl. .................................... 524/405; 523/223; 524/493; 524/430; 524/431; 524/433; 524/404; 524/408; 524/413; 524/610

[58] Field of Search ............... 524/405, 413, 429, 430, 524/431, 493, 610, 700, 701, 708, 730, 731, 779, 780, 781, 783, 784, 785, 790, 791, 856, 859, 860, 861, 863, 864, 881, 913; 528/23, 167, 168, 399; 429/218, 101, 191, 192

[56] References Cited

U.S. PATENT DOCUMENTS

| | | | |
|---|---|---|---|
| 3,304,270 | 2/1967 | Dickerson | 260/2 |
| 3,843,596 | 10/1974 | Kuyker et al. | 524/610 |
| 3,891,594 | 6/1975 | Taylor | 524/701 |
| 4,026,839 | 5/1977 | Dieck et al. | 260/2.5 FP |
| 4,218,556 | 8/1980 | Hergenrother et al. | 528/168 |
| 4,258,173 | 3/1981 | Schulz et al. | 528/168 |
| 4,267,097 | 5/1981 | Michl et al. | 524/786 |
| 4,412,066 | 10/1983 | Allcock et al. | 528/168 |
| 4,582,781 | 4/1986 | Chen et al. | 430/527 |
| 4,656,246 | 4/1987 | Chang et al. | 528/499 |
| 4,663,420 | 5/1987 | Chang | 528/168 |
| 4,668,762 | 5/1987 | Ogata | 528/286 |

FOREIGN PATENT DOCUMENTS

| | | |
|---|---|---|
| 76-151743 | 12/1976 | Japan . |
| 60-173168 | 9/1985 | Japan . |
| 129882 | 4/1986 | Japan . |
| 1052388 | 12/1966 | United Kingdom . |
| 1597698 | 9/1981 | United Kingdom . |

OTHER PUBLICATIONS

Semkow et al., J. Electrochem. Soc., vol. 134, No. 3, (1987), pp. 766–767.
Secondary Solid-State SPE Cells Corda et al., Heterocycles, vol. 24, No. 10, (1986), pp. 2821–2826.
Synthesis of New Cyclophosphazenes Containing Polyoxyethylene Moieties Janout et al., J. Of Polymer Science, vol. 25, (1987), pp. 3489–3493.
The Preparation of Polyphosphazene Oligo (oxyethylene)Branches Shriver et al., Polymer Electrolytes Based On Polyphosphazene Backbones, Polymer Preprints, vol. 28, No. 1, (1987), pp. 438.
Exharos et al., Molecular Spectroscopic Characterization Of Binding Interactions In Phosphazene Stabilized Alumina Dispersions, (1987).
Exarhos et al., J. Am. Ceram. Soc., 71(9), (1988), pp. C406–C407.
P NMR Studies of Aqueous Colloidal Dispersions Stablized by Polyphosphazene Adsorption Tonge et al., J. Electrochem. Soc., (1987), pp. 269–270.
Increased Dimensional Stability in Ionically Conducting Polyphosphazenes Systems.
Higashi et al., Macromolecules, vol. 21, (1988), pp. 2299–2301, A New Class of Cation Conductors: Polyphosphazene Sulfonates.
Cowie et al., Makromol. Chem. Rapid Commun., vol. 9, (1988), Ion conduction in mixtures of salts and polyphosphazenes with pendant 16-crown-5 ether groups, pp. 387–391.
The Effect of Spacer Length On the Conductivity of Cowie et al., Poly(bis(1,4,7,10,13-pentaoxacycqplohexadecane)oxaphosphazene)-sodium perchlorate mixtures, (1988).
J. M. G. Cowie K. Sadaghianizadeh, Makromol. Chem. Rapid Commun. vol. 9, (1988), pp. 387–391.

*Primary Examiner*—Lewis T. Jacobs
*Assistant Examiner*—E. J. Webman
*Attorney, Agent, or Firm*—Paul A. Leipold

[57] ABSTRACT

The invention provides a blend of metal oxide, such as silicon oxide, with etheric phosphazene. The invention optionally contains salt for antistatic coatings. The composition of the invention is formed by preparing solutions of etheric phosphazene and alkoxysilane, such as tetraethoxysilane. The solutions are then coated onto suitable substrates, or cast films and cured at room temperature or with moderate heating. The coatings and films produced are transparent, tough, hard, and flexible. They are multicomponent blends of the silicon oxide and phosphazene. It is also within the invention to form the blends with other metal oxides, rather than silicon, such as titanium, aluminum, or zirconium. The composite may be doped with low lattice energy salts to form antistatic composites.

13 Claims, No Drawings

COMPOSITES OF ETHERIC PHOSPHAZENE AND METAL OXIDES AND THE METHOD OF THEIR FORMATION

FIELD OF THE INVENTION

This invention relates to composite materials that are blends of etheric phosphazenes and metal oxides. Specifically, this invention relates to abrasion resistant compositions comprising an etheric phosphazene blended with a metal oxide formed in a sol-gel process by hydrolysis and condensation of a metal alkoxide. In one embodiment, it relates to an antistatic layer of free standing film or coating that is a blend of etheric phosphazene, sol-gel formed metal oxide, and a salt.

BACKGROUND OF THE INVENTION

Static electricity buildup is common on electrically insulating articles, such as paper-rollers and apparatus, flooring materials, various synthetic resin articles, and on elements having an electrically insulating support. This static electricity buildup can cause various problems. These include jamming of paper in paper-feeding apparatus, dust accumulation, unpleasant electric shocks, or noise in electronic circuits.

In photographic elements, radiation-sensitive emulsions are usually coated on an insulating support, rendering the element susceptible to the buildup of static electric charge. This can cause a number of problems. Among the most serious of these is that the discharge of accumulated static charges exposes the radiation-sensitive layer of the element to light, causing marks on the element when developed.

In order to reduce the accumulation of static charge on elements with electrically insulating articles, the article is often coated with a layer containing an antistatic composition that increases electrical conductivity. Alternatively, the antistatic composition can be incorporated into the composition of the article or an existing layer of an element. Various materials have been used as antistatic compositions, such as polymers, surface active agents, salts, and combinations thereof.

A number of such antistatic compositions exhibit problems, especially when used in photographic elements. For example, they can cause fog or loss of photographic sensitivity. There is a need to provide antistatic compositions that effectively reduce the accumulation of static charge while exhibiting reduced susceptibility to disadvantages such as those described above.

Polyphosphazene antistatic compositions recently have been proposed in copending and coassigned application Ser. No. 087,480 filed Aug. 20, 1987, by Chen et al. In the copending application polyphosphazene is combined with a salt in order to form a conductive composition. This composition has been suggested for use in photographic antistatic layers. While a satisfactory antistatic composition, the material is somewhat tacky and not altogether suitable as an outer coating. Phosphazenes have also been disclosed for anti-static layers in Japanese Application No. 129882—Konishiroku published Dec. 11, 1987.

Phosphazene polymers have also been suggested for use where higher temperature polymers are desirable such as in gaskets for engines, in friction surfaces, and as membranes for separations of gases or liquids. Such uses would not require the addition of salt as the gasket or friction materials would not need to be conductive or have anti-static properties. In use as a gasket material, membranes, or friction surface, as well as in polymer film antistatic surface coats, it is advantageous that the polymer have good abrasion resistance, hardness, and strength. Therefore, it would be desirable if these properties could be improved for phosphazene polymers.

It has been disclosed in U.S. Pat. No. 4,218,556—Hergenrother et al that chlorophosphazene polymers can be cross-linked with tetraalkylorthosilicate. Great Britain Patent No. 1,052,388—Emblem et al discloses that phosphazene trimeric materials may be cross-linked with similar silicates. However, these cross-linked materials have the disadvantage that they are difficult and expensive to make, and are not believed to be abrasion resistant or tough. U.S. Pat. No. 4,026,839—Dieck et al discloses polyphosphazene polymer and silicone rubber blends that are fire retardant and may form foams. U.S. Pat. No. 4,668,762—Ogata and U.S. Pat. No. 3,304,270—Dickerson also discloses silicon-phosphorus containing polymer compositions. It has been disclosed in Exarhos et al, "$^{31}$P NMR Studies of Aqueous Colloidal Dispersions Stabilized by Polyphosphazene Adsorption", *J. Am. Ceram. Soc.*, 71 (9) C-406-C-407 (1988), and Exarhos et al "Molecular Spectroscopic Characterization of Binding Interactions in Phosphazene Stabilized Alumina Dispersions", October 1987, presented at the Materials Research Society 23rd University Conference on Ceramic Science held in Seattle, Wash. Aug. 31, 1987, that polyphosphazenes will be utilized to stabilize alumina dispersions. In the process disclosed in the Exarhos et al articles a small amount of polyphosphazene is mixed with a large amount of large (0.4 micron diameter) aluminum particles. The purpose of the Exarhos et al processing is to form densified ceramic materials by utilizing polyphosphazene as a binder.

There remains a need for phosphazene polymers that have improved properties of cost, ease of formation, strength, and toughness. Transparency in strong phosphazene materials also is desirable.

THE INVENTION

The invention provides a multicomponent blend of metal oxide such as silicon oxide, with an etheric phosphazene. The multicomponent blend is produced by a sol-gel process involving the hydrolysis and condensation of a metal alkoxide. The phosphazene may be an etheric phosphazene polymer, or a cyclic etheric phosphazene. The invention optionally contains salt for blends utilized as antistatic coatings. The preferred compositions of the invention are formed by preparing solutions of phosphazene and alkoxysilane, such as tetraethoxysilane, and optionally a salt. The solutions are then coated onto suitable substrates and cured at room temperature or with moderate heating. The conductivity of the coatings produced does not change substantially with changes in humidity. The coatings are also transparent, tough, hard and flexible so as to not crack when slightly flexed. There are no covalent cross-links between the phosphazene and the metal oxide. Alternatively the solutions are cast into flexible, free standing films or objects. Heating the films makes them stronger until the point is reached where the phosphazene decomposes. It is also within the invention to form the blends with other metal precursors, rather than silicon, such as tantalum, lead, phosphorus, titanium, boron, tin, iron, copper, lanthanum, germanium, yttrium, indium, aluminum, or zirconium. Barium oxide and magnesium oxide mixtures with the above metal oxides also may be utilized in the invention.

MODES OF PERFORMING THE INVENTION

The invention has numerous advantages over other metal oxide and polymer systems and other non metal oxide blended phosphazenes. It is unexpected that an easily formed multicomponent blend of materials produces a transparent, strong, tough yet flexible phosphazene material. The invention is easy to perform in that the two materials are merely blended, not chemically reacted, prior to casting or coating. Therefore there are no difficult to control reactions taking place. The materials of the invention form a tough coating that may be handled without tackiness. The materials make a strong conductive antistatic article or coating by addition of a salt. These and other advantages of the invention will be apparent from the description that follows.

A preferred method of the invention generally is carried out by dissolving an etheric phosphazene material in a solvent, such as alcohol, with stirring. Into the stirred solution of polyphosphazene and alcohol is added a metal oxide precursor, such as tetraethoxysilane. Hydrolysis of the solution is carried out by adding an acid, such as hydrochloric acid, in water to the solution, although the addition of acid (or base) is not essential. The solution is then coated onto a substrate and cured at a temperature of up to about 300° C. The coating then may be removed from the substrate or, if it has been coated on a substrate to which it bonds, will form a laminate with this substrate after curing. Alternatively the solutions are cast into flexible free standing films or objects.

Any suitable polyphosphazene may be utilized in forming the blends of the invention. A preferred composition is an etheric phosphazene comprising repeating units of formula (I):

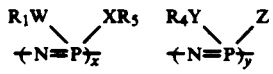

In the above formula, x and y represent molar percentages, with x being 80 to 100%, and y being 0 to 20%. $R_1$ and $R_5$ each independently represent the formula $-(R_2-O)_n-R_3$ where n is 1 to 50 and $R_3$ is hydrogen, alkyl, alkenyl, alkynyl, haloalkyl, haloakenyl, haloalkynyl, phenyl, substituted aromatic, amine or thio of from 1 to 18 carbon atoms. In the repeating unit $-(R_2-O)-$, $R_2$ is randomly alkylene having from 2 to 4 carbon atoms in the straight chain between oxygen atoms.

W, X, and Y each independently represents

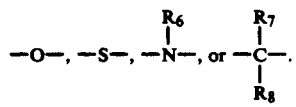

Z represents $-OR_9$,

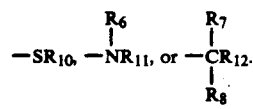

$R_4$, $R_6$, $R_7$, and $R_8$ each independently represents H, alkyl, alkenyl, alkynyl, haloalkyl, haloakenyl, haloalkynyl, phenyl, substituted aromatic, amine, or thio of from 1 to 18 carbon atoms. $R_9$ and $R_{10}$ each independently represents alkyl, alkenyl, alkynyl, haloalkyl, haloakenyl, haloalkynyl, phenyl, substituted aromatic, amine, or thio of from 1 to 18 carbon atoms or $-(R_{13}-O)_m-R_{14}$. $R_{11}$ and $R_{12}$ each independently represents H, alkyl, alkenyl, alkynyl, haloalkyl, haloakenyl, haloalkynyl, phenyl, substituted aromatic, amine, or thio of from 1 to 18 carbon atoms, or $-(R_{13}-O)_m-R_{14}$. $R_{13}$ is randomly alkyl of from 2 to 4 carbon atoms, having from 2 to 4 carbon atoms in the straight chain between oxygen atoms. $R_{14}$ is H, alkyl, alkenyl, alkenyl, alkynyl, haloalkyl, haloakenyl, haloalkynyl, phenyl, substituted aromatic, amine, or thio of from 1 to 18 carbon atoms and m is 0 to 50.

Polyphosphazene compounds that are useful in the present invention are those of formula (I). In that formula, x and y represent molar percentages, with x being 80 to 100% and y being 0 to 20%. Preferred values for x are from 90 to 100% and preferred values for y are from 0 to 10%.

$R_1$ and $R_5$ are independently represented by the formula $-(R_2-O)_n-R_3$. Useful compounds according to the invention are those where n is from 1 to 50. Especially preferred values for n are from 2 to 10.

$R_2$ and $R_{13}$ are each independently randomly alkylene of from 2 to 4 carbon atoms and preferably 2 to 3 carbon atoms, having from 2 to 4 carbon atoms and preferably 2 carbon atoms in the straight chain between oxygen atoms. By "randomly alkylene of from 2 to 4 carbon atoms," it is meant that the $R_2$ or $R_{13}$ in each of the repeating units $-(R_2-O)-$ or $-(R_{13}-O)-$ may be different from other $R_2$'s or $R_{13}$'s, as long as each of the $R_2$'s or $R_{13}$'s falls within the overall limitation of being between 2 to 4 carbon atoms, having from 2 to 4 carbon atoms in the straight chain between oxygen atoms. For example, where n=3 and $R_3$ is ethyl, $R_1$ could be $-CH_2CH_2-O-CHCH_3CHCH_3-O-CH_2CHC-H_3-O-C_2H_5$. Examples of $R_2$ include ethylene, n-propyl, isopropylene, and n-butylene.

$R_3$ and $R_{14}$ each independently represents (and $R_9$ and $R_{10}$ may each independently represent) alkyl, alkenyl, alkynyl, haloalkyl, haloakenyl, haloalkynyl, phenyl, substituted aromatic, amine, or thio typically of from 1 to 18 carbon atoms. Preferably, $R_3$ is alkyl, alkenyl, haloalkyl or aromatic of from 1 to 8 carbon atoms. Useful as $R_3$ and $R_{14}$ groups include substituted alkyl, alkenyl, or aromatic groups of from 1 to 18 carbon atoms. Examples of substituents include halogen such as F or Cl, amino groups such as $NH_2$, $NHCH_3$, or $N(CH_3)_2$, and thio-containing groups, such as alkylthio (e.g., methylthio, ethylthio) or sulfonate. A preferred substituted $R_3$ is a terminally halogen substituted alkyl group, such as a perfluoroalkyl. Examples of $R_3$ include $-CH_3$, $-CH_2CH_3$, $-CH_2CF_3$, $-CH_2CCl_3$, $-(CH_2)_5CH_3$, $-(CH_2)_4-CH=CH-CH_3$, $-CH_2-O-CH_3$ and $(C_6H_4)-(C_8H_{17})$.

$R_4$, $R_6$, $R_7$, and $R_8$ each independently represents (and $R_{11}$ and $R_{12}$ may each independently represent) hydrogen, alkyl, alkenyl, alkynyl, haloalkyl, haloakenyl, haloalkynyl, phenyl, substituted aromatic, amine, or thio typically of from 1 to 18 carbon atoms. Preferably, they are H or alkyl, or alkenyl of from 1 to 8 carbon atoms. Also useful are substituted alkyl or alkenyl groups of from 1 to 18 carbon atoms. Examples of substituents include halogen such as F or Cl, amino groups such as $NH_2$, $NHCH_3$, or $N(CH_3)_2$, and thio-containing groups, such as alkylthio (e.g., methylthio, ethylthio) or sulfonate. Examples of $R_4$, $R_6$, $R_7$, $R_8$, $R_{11}$, and $R_{12}$ include —$CH_3$, —$CH_2CH_3$, —$CH_2CF_3$, —$CH_2CCl_3$, —$(CH_2)_5CH_3$, —$(CH_2)_4$—$CH=CH$—$CH_3$, —$CH_2$—O—$CH_3$, and $(C_6H_4)$—$(C_8H_{17})$.

The molecular weight of the compound of formula (I) is preferably between $2\times10^3$ and $1\times10^7$, and more preferably between $1\times10^4$ and $1\times10^6$.

A second preferred phosphazene of present invention has a composition comprising a cyclic phosphazene of the formula (II):

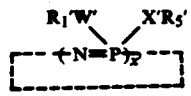

in the above formula, x' is 3 or 4.

$R_1'$ and $R_5'$ each independently represent the formula —$(R_2$—O$)_n$—$R_3$ where n is 0 to 50 and n is 2 or more in at least half of the total substituents. $R_3'$ is alkyl, alkenyl, alkynyl, haloalkyl, haloalkenyl, haloalkynyl, phenyl, substituted aromatic, amine, or thio of from 1 to 18 carbon atoms. In the repeating unit —$(R_2'$—O$)$—, $R_2'$ is randomly alkyl, having from 2 to 4 carbon atoms in the straight chain between oxygen atoms. W' and X' each independently represents —O—, —S—,

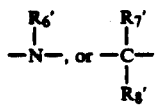

$R_6'$, $R_7'$, and $R_8'$ each independently represents H, alkyl, alkenyl, alkynyl, haloalkyl, haloalkenyl, haloalkynyl, phenyl, substituted aromatic, amine, or thio of from 1 to 18 carbon atoms.

In the phosphazene compounds that are particularly useful in Formula II above:

$x^7$ represents an integer of 3 or 4. $R_1'$ and $R_5'$ are independently represented by the formula —$(R_2'$—O)-$_n$—$R_3'$. Useful compounds according to the invention are those where n is from 0 to 50, and n must be 2 or more in at least half of the total substituents. Especially preferred values for n are from 2 to 18. Each $R_2'$ is independently randomly alkyl of from 2 to 4 carbon atoms and preferably 2 to 3 carbon atoms, having from 2 to 4 carbon atoms and preferably 2 carbon atoms in the straight chain between oxygen atoms. By "randomly alkyl of from 2 to 4 carbon atoms" it is meant that the $R_2'$ in each of the repeating units —(R-$_2'$—O)—may be different from other $R_2'$'s, as long as each of the $R_2'$'s falls within the overall limitation of being between 2 to 4 carbon atoms, having from 2 to 4 carbon atoms in the straight chain between oxygen atoms. For example, where n=3 and $R_3'$ is ethyl, $R_1'$ could be —$CH_2CH_2$—O—$CHCH_3$—O—$CH_2CHC$-$H_3$—O—$C_2H_5$. Examples of $R_2'$ include ethylene, n-propylene, isopropylene, and n-butylene.

$R_3'$ represents alkyl, alkenyl, alkynyl, haloalkyl, haloalkenyl, haloalkynyl, phenyl, substituted aromatic, amine, and thio typically of from 1 to 18 carbon atoms. Preferably $R_3'$ is alkyl, alkenyl, haloalkyl, or aromatic of from 1 to 8 carbon atoms. Examples of substituents include halogen such as F or Cl, amino groups such as $NH_2$, $NHCH_3$, or $N(CH_3)_2$, and thio-containing groups, such as alkylthio (e.g., methylthio, ethylthio) or sulfonate. A preferred substituted $R_3'$ is a terminally halogen substituted alkyl group, such as a perfluoroalkyl. Examples of $R_3'$ include —$CH_3$, —$CH_2CH_3$, —$CH_2CF_3$, —$CH_2CCl_3$, —$(CH_2)_5CH_3$, —$(CH_2)_4$—$CH=CH$—$CH_3$, —$CH_2$—O—$CH_3$, and $(C_6H_4)$—$(C_8H_{17})$.

$R_6'$, $R_7'$, and $R_8'$ each independently represents hydrogen, alkyl, alkenyl, alkynyl, haloalkyl, haloalkenyl, haloalkynyl, phenyl, substituted aromatic, amine, and thio typically of from 1 to 18 carbon atoms. Preferably, they are H or alkyl, or alkenyl of from 1 to 8 carbon atoms. Also useful are substituted alkyl or alkenyl groups of from 1 to 18 carbon atoms. Examples of substituents include halogen such as F or Cl, amino groups such as $NH_2$, $NHCH_3$, or $N(CH_3)_2$, and thio-containing groups, such as alkylthio (e.g., methylthio, ethylthio) or sulfonate.

The molecular weight of the cyclic phosphazene compounds of the invention is preferably between 500 and $1.0\times10^4$, and more preferably between 500 and 7500 as generally obtained by mass spectrometry or by membrane osmometry.

The salts that are useful when forming antistatic coatings with the multicomponent blends in the present invention are those that complex with the phosphazenes of formula (I) or formula (II). Any salt that complexes with the phosphazenes is useful. Whether a salt complexes with the phosphazene can be easily determined by methods known in the art, such as electrical conductivity measurements, differential scanning calorimetry (DSC) (measuring changes in glass transition temperature), vibrational spectroscopy, and nuclear magnetic resonance, or a combination thereof. Further disclosure on phosphazene/salt complex formation is presented in Blonsky, Shriver, Austin, & Allcock, *Solid State Ionics* 1986, 18-19, pp. 258-64.

A number of factors can be utilized to determine whether the salt will be likely to complex with the etheric phosphazene. The greater the flexibility of the polymer backbone of the polyphosphazene, the more receptive it is to complexing with all salts. Similarly, the higher the concentration of polar groups in the phosphazene, the more receptive it is to complexing with all salts. Salts that have a greater solubility with the phosphazene will tend to complex with the phosphazene to a greater extent than salts with lower solubility. Salts with a low lattice energy tend to complex with the etheric phosphazene to a greater extent than salts with a high lattice energy. Salts with bulky anions tend to complex with the phosphazene to a greater extent than salts with smaller anions. Also, salts with lower valence charges (e.g., mono and divalent salts) tend to complex with the phosphazene to a greater extent than salts with greater valence charges (e.g., trivalent salts).

Typical salts suitable for antistatic compositions of the invention include $KCF_3SO_3$, $Ca(CF_3SO_3)_2$, $Zn(BF_4)_2$, $LiBF_4$, $NaBF_4$, $NaCF_3SO_3$, $KCF_3CO_2$, $LiCF_3CO_2$, $NaCF_3CO_2$, $KC_3F_7CO_2$, $LiC_3F_7CO_2$, $NaC_3F_7CO_2$, LiI, NaI, KI, $C_4F_9SO_3K$, $KPF_6$, $NaB(C_6H_5)_4$, $LiCF_3SO_3$, $LiClO_4$, KSCN, LiSCN, and NaSCN. One skilled in the art could easily choose a number of additional salts according to the invention, given the salts exemplified above, the factors leading to a likelihood of the salt complexing with the polyphosphazene, and the above-described tests to determine whether the salt complexes with the polyphosphazene.

The material that forms the metal oxide in the blend of the invention may be derived from any inorganic monomer that has a hydrolyzable leaving group, that is soluble in the solvents for the phosphazene, and that is capable of forming a cross-linked network via hydrolysis and condensation. The metal of the metal oxide may be defined as any electropositive chemical element characterized by ductility, malleability, luster, conductance of heat and electricity, which can replace the hydrogen of an acid and forms bases with the hydroxyl radical. According to a particularly preferred embodiment, the oxides employed are silicic acid heteropolycondensates that have been prepared by hydrolysis and polycondensation of at least one silicon-functional silane of the general formula $SiX_4$ wherein X is hydrogen, halogen, alkoxy, aryloxy, carboxy, or an $-NR_2$ group, in which R is hydrogen and/or alkyl, and/or aryl with the proviso that not all of X are hydrogen. Also suitable are heteropolycondensates in which at least some of the silicon has been substituted by other metals including titanium, boron, aluminum, indium, zirconium, fin, tantalum, lead, phosphorus, lanthanum, iron, copper, yttrium, and germanium. Barium and magnesium oxide mixtures with above metal oxides also may be utilized in the invention. The preferred substituted materials are titanium, zirconium and aluminum, as these materials form transparent and strong layers and coatings. A preferred silane is tetraethoxysilane as it is readily available, low in cost, and forms a transparent, hard composite with the polyphosphazene.

The polyphosphazene, metal oxide, and optionally salt such as potassium triflate ($CF_3SO_3K$), form the required elements for the invention, it is also possible that the compositions of the invention may contain other materials such as fillers or materials such as fire retardants or coating aids. The composite blends of the invention are transparent as all or substantially all of the areas of metal oxide have a size of less than 2000Å and preferable less than 500Å for the strongest and most transparent materials. However, in some instances there may be impurities or deliberately added dyes or pigments that render the products non-transparent. While transparency is generally desirable, for some uses it is not necessary. The term "transparent" as used herein means that letter quality pica print on white paper can be read through a 0.5 cm thick layer of the composite blend material of the invention.

The temperature at which curing of the solutions after coating takes place may be any desired temperature that provides sufficient condensation of the materials utilized. Typical curing temperatures are between about 25° C. and 300° C.

The method of forming the composites of the invention include any conventional polymer forming process. Typical of such processes are extruding, spinning, dipping, or casting coatings that either bind to a substrate or may be removed from the substrate forming a film. Alternatively, the solutions can be cast into free standing films or objects. Further, many of the materials may be cast on water and at least partially cured while on the water.

The phosphazene and metal oxide of the invention may be combined in any amounts that give a suitable product. Typical of such combinations are those of between about 20% and about 95% by weight of the phosphazene combined with between about 5% and about 80% by weight of the material forming the metal oxide. It has been found that an amount of between about 40 and about 60 weight percent of phosphazene in combination with between about 40 and about 60% by weight of the silicon dioxide precursor is suitable to give products of desirable strength. A preferred blend has been found to be about 50% of each component for the best balance of strength, hardness, flexibility and conductivity.

The finished composite material after curing typically has a metal oxide content of between about 1 and about 80 percent by weight. At higher oxide contents the materials become brittle and may fall apart when flexed or handled. A preferred amount of metal oxide content is between about 10 and about 60 percent by weight to form a strong and continuous network of the metal oxide. The optimum amount of metal oxide for oxides of aluminum, titanium, silicon and zirconium has been found to be between about 20 and about 30 percent by weight for the strongest and most flexible materials.

The amount of salt utilized in the antistatic formulas may be any amount that gives a suitable amount of conductivity in the product being formed. Typical weight of salt is between about 5 and about 20 weight percent of the finished product.

EXAMPLES

The practice of the invention is further illustrated by the following examples.

PREPARATION 1

Poly(dichlorophosphazene)

Poly(dichlorophosphazene) was prepared by the thermal polymerization of hexachlorocyclotriphosphazene (($NPCl_2)_3$) at 250° C. Polymerization of ($NPCl_2)_3$ was carried out in sealed Pyrex TM glass tubes of size 23 × 3.5 cm (200 g scale). Crushed Pyrex glass (2 g) was added to the tube to facilitate initiation. The tubes were evacuated on a vacuum line for 30 minutes before they were sealed. The sealed tubes were heated at 250° C. until the contents became viscous, about 24 hours. After the tubes had cooled to room temperature, they were placed in a glove bag filled with argon, the Pyrex tube broken open and the contents placed in a sublimator. The bulk of the starting trimer (50 g) was removed from the polymer during the sublimation (50° C., 16 hours). The remaining polymer was a white material that was highly elastomeric and formed clear viscous solutions in tetrahydrofuran and toluene.

PREPARATION 2

Poly[bis(2-(2-methoxyethoxy)ethoxy)phosphazene] (MEEP)

A solution of poly(dichlorophosphazene) (33 g, 0.28 mol) in tetrahydrofuran (THF) (500 mL) was added over a 3-hour period to a stirred suspension of sodium 2-(2-methoxyethoxy)ethoxide, prepared from sodium hydride (40 g, 0.83 mol) and 2-(2-methoxyethoxy)ethanol (150 g, 1.25 mol) in THF (500 mL). Tetra-n-butylammonium bromide (0.5 g) was added. The reaction was stirred for 48 hours at room temperature and then was refluxed for 1 hour to finish the substitution. The reaction was neutralized with 5% HCl. The reaction mixture was dialyzed against water and freeze-dried. The freeze-dried polymer (60 g) was dissolved in acetone (800 mL) and filtered through a coarse glass frit. It was then precipitated into heptane (4 × 1500 mL). The polymer was redissolved in acetone and reprecipitated into heptane as before. A $^{31}P\{^1H\}$ NMR spectrum consisted of a sharp singlet at $-7.6$ PPM, which was indicative of total halogen replacement. Yield was 23%. IR (P=N), 1240 cm$^{-1}$. Intrinsic viscosity was 1.06 dl/g. Low angle laser light scattering gave an apparent weight average molecular weight of $5.4 \times 10^5$ gm/mol. Elemental analysis (found/theoretical, %): N (5.0/4.9), C (41.8/42.4), H (7.6/7.8), P (11.3/10.9), Cl (<0.3/0.0).

PREPARATION 3

Octakis(2-(2-methoxyethoxy)ethoxy)cyclotetraphosphazene (MEEP-tetramer)

An alkoxide solution was prepared by the addition of 2-(2-methoxyethoxy)ethanol (213 mL, 1.81 mol) to a mixture of sodium spheres (22.7 g, 0.99 mol) in THF. Tetrabutylammonium bromide (0.27 g) was added to the alkoxide solution followed by the dropwise addition of a solution of octachlorocyclotetraphosphazene (50.7 g, 0.11 mol) in THF. The reaction was stirred at 25° C. for 72 hours, refluxed for 5 hours, stirred at 25° C. for 16 hours. The reaction mixture was neutralized and the product isolated as described for Compound A. A $^{31}P\{^1H\}$ (proton decoupled) NMR spectrum showed a singlet at +2 PPM. IR (P=N), 1320 cm$^{-1}$.

EXAMPLE 1

MEEP/silicon spin coatings

A solution of Preparation 2 (MEEP) was prepared by dissolving 2 g of Preparation 2 in 40 mL of ethanol. 5 mL of the MEEP/ethanol solution was stirred with 1.5 mL of tetraethoxysilane (TEOS) in an Erlenmeyer flask with a magnetic stirrer. Hydrolysis was carried out by adding 0.5 mL of 0.15M HCl in water. After the reaction was thoroughly mixed, 50 mg of potassium triflate, CF$_3$SO$_3$K, was added to the reaction mixture. After the solution turned clear, it was warmed in a 60° C. water bath, after which it was still clear. The solution was then spin coated onto a 4-inch silicon wafer at 2000 rpm for 30 sec. The coated sample was then cured by heating in a furnace at 250° C. for 30 min.

Surface resistivity was measured using a Leithly picoammeter according to the procedure of ASTM standard D257 at 70° F. The measurement at ambient conditions was log 9 ohms/sq. The value after storing the sample at 20% RH (relative humidity) was log 10 ohms/sq. Two control experiments were performed. First, the resistivity of the back of the silicon wafer was measured to be log 13 ohm/sq. Thus the coated side was 3-4 orders of magnitude more conductive.

As a control a spin coating of the TEOS with the lithium triflate but without Preparation 2 material also gave a resistivity value of log 13 ohm/sq. As a control a coating of Preparation 2 and lithium triflate gave a resistivity value of log 5 ohm/sq.

EXAMPLE 2

MEEP/titanium spin coatings

A solution of Preparation 2 was prepared by dissolving 2 g of Preparation 2 in 80 mL of 50/50 THF/ethanol. (This gave a more transparent solution than using 100% ethanol.) 12 mL of this stock solution was stirred with 0.3 mL of titanium isopropoxide in an Erlenmeyer flask with a magnetic stirrer and 50 mg CF$_3$SO$_3$K. Hydrolysis was carried out by adding 0.12 mL of 0.15M HCl. The reaction mixture was stirred at room temperature for not less than 5 minutes and spin coated within 1 h. The coating was made onto a silicon wafer that was pretreated to give 800 Å of a silicon dioxide surface. The spinning rate was 2000 rpm and was carried out for 30 sec. The wafer was cut in half, and one part was heated in a furnace at 150° C. for 30 min. Surface resistivity of the room temperature processed coating was log 6.3 ohm/sq. and log 8.6 ohm/sq for the sample processed at 150° C. The relative humidity (RH) was 36%.

EXAMPLES 3-7

A stock solution of preparation 2 (MEEP) was prepared by dissolving 2 g of MEEP in 80 mL of a 1:1 mixture of THF/ethanol.

EXAMPLE 3

MEEP/silicon films 0.3 mL of tetraethoxysilane was added to 12 mL of stirred stock solution followed by the addition of 0.12 mL of 0.15M HCl. The solution was allowed to stir for 15 minutes, poured into a teflon dish and the dish covered with a beaker to slow evaporation of the solvents. After 4 days at room temperature a 75 micron free-standing film was taken from the dish. The bulk conductivity of the film was $1 \times 10^{-8}$ (ohm cm)$^{-1}$. Dynamic mechanical measurements are discussed below. The film is transparent.

EXAMPLE 4

MEEP/silicon/salt films.

The same procedure was followed as described in Example 3 except that 50 mg of potassium triflate was added to the reaction mixture before it was poured into a teflon dish. The bulk conductivity of a 73 micron film increased to $1 \times 10^{-6}$ (ohm cm)$^{-1}$. Dynamic mechanical measurements are discussed below.

EXAMPLE 5

MEEP/titanium films 0.3 mL of titanium isopropoxide was added to 12 mL of stirred stock solution and was allowed to stir for 15 minutes, poured into a teflon dish and the dish covered with a beaker to slow evaporation of the solvents. After 4 days at room temperature a 80 micron free-standing film was taken from the dish. The bulk conductivity of the film was $1 \times 10^{-8}$ (ohm cm)$^{-1}$. Dynamic mechanical measurements are discussed below. The film is transparent.

EXAMPLE 6

MEEP/titanium/salt films

The same procedure was followed as in Example 5 except that 50 mg of potassium triflate was added to the reaction mixture before it was poured into a teflon dish. The bulk conductivity of a 63 micron film increased to $1 \times 10^{-5}$ (ohm cm)$^{-1}$.

Dynamic Mechanical Measurements

MEEP is an amorphous polymer, having a glass transition temperature, $T_g$, at $-75°$ C. Above this temperature, the MEEP polymer is in what is termed the "flow regime" of viscoelasticity, that is it flows like a very viscous material and therefore will not keep its shape when subjected to an external force. When the MEEP is mixed with TEOS under acid conditions, cast from solution in a Teflon ® dish and dried, a self-supporting film is produced (Example 3). This composite has the same glass transition temperature as pure MEEP (about $-75°$ C.), however, in contrast to the MEEP alone, the composite does not flow at temperatures above $T_g$.

This is shown experimentally by the dynamic mechanical analysis results where a rubber plateau above $T_g$ is observed. The modulus of this plateau is very high (on the order of $10^9$ dynes/cm$^2$) and extends to at least 200° C., as evidenced by the storage modulus, E', in the dynamic mechanical results. The net result is that the composites have much better physical integrity than MEEP alone.

Adding the salt to these composites (Example 4) does not change the observed modulus, but it does have the added effect of increasing the $T_g$ of the composite. Adding the salt to pure MEEP will increase its $T_g$ in proportion to the salt concentration. If the $T_g$ of the polymer increased too much, the conducting properties will decrease. Similar results are obtained when titanium isopropoxide is used instead of TEOS (Examples 5 and 6).

EXAMPLE 7

MEEP/titanium castings 29 mL of the MEEP stock solution was stirred with 0.6 mL of titanum isopropoxide followed by the addition of 0.2 mL 0.15M HCl. The solution was placed in a 4 dram plastic bottle whose top had been previously cut off to help solvent evaporation. The sample was covered with a large beaker. After curing at room temperature for 8 days the sample was found to have a Shore A hardness of 47. As a control, MEEP was found to have a Shore A hardness of 0.

EXAMPLE 8

MEEP-tetramer/silicon film

A solution of Preparation 3 (MEEP-tetramer) was prepared by dissolving 2 grams of Preparation 3 in 40 mL of a 1:1 mixture of THF/ethanol. 10 mL of the tetramer solution was stirred with 0.54 mL of TEOS in an Erlenmeyer flask with a magnetic stirrer. Hydrolysis was carried out by adding 0.17 mL of 0.15M HCl in water. The clear solution was coated onto Estar ® with an 8 mil coating knife. The solvents were allowed to evaporate overnight to leave a clear film that did not flow. In contrast, the MEEP-tetramer without TEOS was an oil that flowed off the support.

EXAMPLE 9

MEEP-tetramer/titanium film

A solution of Preparation 3 (MEEP-tetramer) was prepared by dissolving 2 grams of Preparation 3 in 40 mL of a 1:1 mixture of THF/ethanol. 10 mL of the tetramer solution was stirred with 0.52 mL titanium isopropoxide in an Erlenmeyer flask with a magnetic stirrer. Hydrolysis was carried out by adding 0.13 mL of 0.15M HCl in water. The clear solution was coated onto Estar ® polyester film with an 8 mil coating knife. The solvents were allowed to evaporate overnight to leave a clear film that did not flow. In contrast, the MEEP-tetramer without alkoxide was an oil that flowed off the support. If the tetramer/titanium mixture was not coated but was allowed to stand, the viscous solution formed a gel in the flask.

The above examples demonstrate that the materials of the invention produce a transparent and optionally conductive coating with ease of formation.

This invention has been described in detail with particular reference to particular embodiments thereof, but it will be understood that variations and modifications can be effected within the scope and spirit of the invention. The invention is only intended to be limited by the breadth of the claims.

What is claimed is:

1. A process of forming a blended composite comprising combining etheric phosphazene and a metal oxide precursor in a solvent solution, said metal oxide precursor comprises a silicic acid heteropolycondensate prepared by polycondensation of at least one silicon-functional silane of the formula SiX$_4$ wherein X is hydrogen, halogen, alkoxy, aryloxy, carboxy, or an —NR$_2$ group in which R is hydrogen and/or alkyl and/or aryl with the proviso that not all X are hydrogen, mixing until the etheric phosphazene and metal oxide precursor are dissolved, casting the dissolved materials and curing to recover a blended composite of etheric phosphazene and metal oxide that is not covalently cross-linked between the etheric phosphazene and metal oxide.

2. The process of claim 1 wherein said curing is by heating to between about 25° C. and about 300° C. and said metal oxide precursor comprises a metal alkoxide.

3. The process of claim 1 wherein said metal oxide precursor comprises metal oxide with the metal portion of said metal oxide selected from at least one member of the group consisting of silicon, titanium, boron, aluminum, zirconium, tin, germanium, tantalum, phosphorus, lead, arsenic, lanthanum, iron, indium, copper, yttrium, barium, magnesium and mixtures thereof.

4. The process of claim 3 wherein said phosphazene polymer comprises at least one material selected from the group consisting of:

I. a polyphosphazene comprising repeating units for the formula:

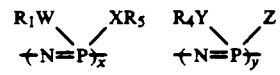

wherein x and y represent molar percentages, with x being 80 to 100% and y being 0 to 20%.

R$_1$ and R$_5$ each independently represents the formula —(R$_2$—O)$_n$—R$_3$ wherein n is 1 to 50, R$_2$ is randomly alkyl of from 2 to 4 carbon atoms, having from 2 to 4 carbon atoms in the straight chain between oxygen atoms, and R$_3$ is alkyl, alkenyl, alkynyl, haloalkyl, haloalkenyl, haloalkynyl, phenyl, substituted aromatic, amine or thio of from 1 to 18 carbon atoms, W, X and Y each independently represents

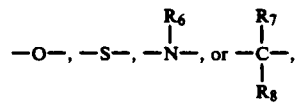

Z represents

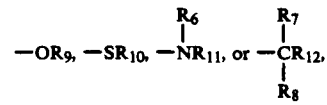

wherein R$_4$, R$_6$, R$_7$, and R$_8$ each independently represents H, alkyl, alkenyl, alkynyl, haloalkyl, haloalkenyl, haloalkynyl, phenyl, substituted aromatic, amine or thio of from 1 to 18 carbon atoms, $R_9$ and $R_{10}$ each independently represents alkyl, alkenyl, alkynyl, haloalkyl, haloalkenyl, haloalkynyl, phenyl, substituted aromatic, amine or thio of from 1 to 18 carbon atoms or $-(R_{13}-O)_m-R_{14}$, $R_{11}$ and $R_{12}$ each independently represents H, alkyl, alkenyl, alkynyl, haloalkyl, haloalkenyl, haloalkynyl, phenyl, substituted aromatic, amine or thio of from 1 to 18 carbon atoms, or $-(R_{13}-O)_m-R_{14}$, $R_{13}$ is randomly alkyl of from 2 to 4 carbon atoms, having from 2 to 4 carbon atoms in the straight chain between oxygen atoms.

$R_{14}$ is alkyl, alkenyl, alkynyl, haloalkyl, haloalkenyl, haloalkynyl, phenyl, substituted aromatic, amine or thio of from 1 to 18 carbon atoms, and m is 0 to 50, and:

II. a phosphazene cyclic comprising repeating units of the formula:

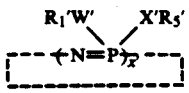

wherein the x' is 3 or 4, $R_1'$ and $R_5'$ each independently represents the formula $-(R_2'-O)_{n'}-R_3'$ wherein n' is 0 to 50, and n' is 2 or more for at least half of the total substituents. $R_2'$ is randomly alkyl of from 2 to 4 carbon atoms in the straight chain between oxygen atoms, and $R_3'$ is alkyl, alkenyl, alkynyl, haloalkyl, haloalkenyl, haloalkynyl, phenyl, substituted aromatic, amine, or thio of from 1 to 18 carbon atoms, W', and X', each independently represents

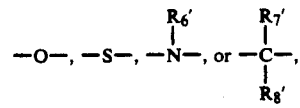

wherein $R_6'$, $R_7'$, and $R_8'$ each independently represents H, alkyl, alkenyl, alkynyl, haloalkyl, haloalkenyl, haloalkynyl, phenyl, substituted aromatic, amine, or thio of from 1 to 18 carbon atoms.

5. A process of claim 4 wherein $R_2'$ has 2 carbon atoms in the straight chain between oxygen atoms, n is from 2 to 10.

6. The process of claim 5 wherein W' and X' each independently represent $-O-$.

7. The process according to claim 6 wherein $R_2'$ and $R_3'$ are each independently methyl or ethyl.

8. The process of claim 1 wherein a salt is combined with said phosphazene and said metal oxide and wherein said salt is selected from the group consisting of $KCF_3SO_3$, $Ca(CF_3SO_3)_2$, $Zn(BF_4)_2$, $LiBF_4$, $NaBF_4$, $NaCF_3SO_3$, $KCF_3CO_2$, $LiCF_3CO_2$, $NaCF_3CO_2$, $KC_3F_7CO_2$, $LiC_3F_7CO_2$, $NaC_3F_7CO_2$, $LiI$, $NaI$, $KI$, $C_4F_9SO_3K$, $KPF_6$, $NaB(C_6H_5)_4$, $LiCF_3SO_3$, $LiCaO_4$, $KSCN$, $LiSCN$, and $NaSCN$.

9. The process of claim 4 wherein $R_3'$ is substituted alkyl, alkenyl, alkynyl, haloalkyl, haloalkenyl, haloalkynyl, phenyl, substituted aromatic, amine, or thio of from 1 to 18 carbon atoms.

10. The process of claim 9 wherein $R_3'$ represents a halogen substituted alkyl, or phenyl, group.

11. The process according to claim 4 wherein said cyclic phosphazene is octakis(2-(2-methoxyethoxy)ethoxy)cyclotetraphosphazene.

12. The process of claim 1 wherein said etheric phosphazene is utilized in the amount of between about 20 and 95 percent by weight and said metal oxide precursor is used in an amount between 5 and about 80 percent by weight.

13. The process of claim 1 wherein said casting is by spin coating onto a substrate.

* * * * *